(12) United States Patent
Bond et al.

(10) Patent No.: US 8,363,914 B2
(45) Date of Patent: Jan. 29, 2013

(54) METHOD AND APPARATUS FOR PROCESSING MEDICAL IMAGING DATA USING PHASE INFORMATION

(75) Inventors: Sarah Bond, Oxfordshire (GB);
Xiao-Bo Pan, Oxfordshire (GB)

(73) Assignee: Siemens Medical Solutions USA, Inc., Malvern, PA (US)

( * ) Notice: Subject to any disclaimer, the term of this patent is extended or adjusted under 35 U.S.C. 154(b) by 227 days.

(21) Appl. No.: 12/974,146

(22) Filed: Dec. 21, 2010

(65) Prior Publication Data

US 2011/0150311 A1 Jun. 23, 2011

(30) Foreign Application Priority Data

Dec. 21, 2009 (GB) .................................. 0922223.3

(51) Int. Cl.
*G06K 9/00* (2006.01)
(52) U.S. Cl. .............................. 382/128; 128/922; 378/4
(58) Field of Classification Search .................. 382/100, 382/128, 129, 130, 131, 132; 128/922; 378/4–27; 329/345, 346; 332/144; 375/226
See application file for complete search history.

(56) References Cited

U.S. PATENT DOCUMENTS

| | | | | |
|---|---|---|---|---|
| 6,011,874 | A * | 1/2000 | Gluckstad | 382/276 |
| 6,525,523 | B1 * | 2/2003 | Soma et al. | 324/76.77 |
| 6,611,571 | B1 * | 8/2003 | Nakajima | 375/327 |
| 6,621,860 | B1 * | 9/2003 | Yamaguchi et al. | 375/226 |
| 6,674,880 | B1 * | 1/2004 | Stork et al. | 382/128 |
| 7,949,095 | B2 * | 5/2011 | Ning et al. | 378/62 |
| 2009/0208080 | A1 * | 8/2009 | Grau et al. | 382/131 |

\* cited by examiner

*Primary Examiner* — Anand Bhatnagar

(74) *Attorney, Agent, or Firm* — Schiff Hardin LLP

(57) ABSTRACT

In a method and apparatus for processing medical imaging data of a subject are disclosed, the data having a physiological or anatomical feature of interest, from a first set of the imaging data, an intensity projection line along a specified axis of an image volume of the data is generated. The projection line is converted to a monogenic signal and phase information extracted from the signal. A function of the phase information is calculated, and the thus processed phase information is used to locate the feature of interest in the first data set, or to register the feature of interest with a second data set.

18 Claims, 8 Drawing Sheets

METHOD AND APPARATUS FOR PROCESSING MEDICAL IMAGING DATA USING PHASE INFORMATION

BACKGROUND OF THE INVENTION

1. Field of the Invention

This invention is directed to a method and apparatus for processing medical imaging data using phase information, in particular to methods for location or registration of a feature of interest.

2. Description of the Prior Art

In the medical imaging field, several imaging schemes are known. For example PET (Positron Emission Tomography) is a method for imaging a subject in 3D using an injected radioactive substance which is processed in the body, typically resulting in an image indicating one or more biological functions. For example, in assessment of heart disease, a tracer can be used with scans concentrating on the perfusion of the left ventricle of the heart. PET and SPECT have been used in cardiac imaging to image perfusion and viability of the myocardium using 13NH3, 82Rb, 18FDG, 201TI, 99 mTc-Sestamibi, 99 mTc-Tetrofosm in etc.

Over the course of a dynamic scan (for example, for cardiac perfusion studies) the likelihood that a patient will move in some way is high. This motion can either be a twitch or a sudden change of position or a gradual motion as the patient relaxes over the time period of the scan. While the gross body alignment usually only changes by a small amount, this change is significant when looking at smaller organs, for example in the case of cardiac imaging. Such motion can lead to severe errors in post-processing analysis and quantification.

Consequently a motion correction (or tracking) algorithm is employed to account for these changes. Motion correction is a well understood and studied area for dynamic imaging for both medical and non-medical applications and many methods have been developed to that purpose. However, for the most part these methods assume that the appearance of the object being tracked, remains constant or stable.

However, in the case for example of imaging the Left Ventricle (LV) of the heart, for instance for the purpose of further quantitative investigation, such as Coronary Flow Reserve (CFR), this assumption is not valid: the dynamic imaging sequence involves an injection of a radionuclide agent at start of the acquisition, and the subsequent quantification relies on the analysis of the distribution of the tracer over time, into various parts of the body. As a consequence, the appearance of the LV changes dramatically over the time of the scan as the tracer diffuses through the body and the organ of interest. The tracer first enters the blood pool of the LV as it is pumped around the body; it is then washed out of the blood pool and gradually enters the myocardial muscle. FIGS. 1 and 2 show four different timepoints of the same scan indicating the large appearance changes that occur.

FIG. 1 illustrates the blood input function curve (102) of a dynamic scan indicating four timepoints: Timepoint 1 is prior to injection, Timepoint 2 is when the tracer peaks in blood pool, Timepoint 3 shows the blood having significantly washed out of the blood pool and entered the myocardium, and Timepoint 4 is the last frame when blood will be present in the myocardium, when the tracer distribution is stabilised.

FIG. 2 illustrates the left ventricle (202) at the same time points as in FIG. 1.

Conventional motion correction techniques will align the late frames well, as the appearance of the heart in these frames remains fairly constant, however they will fail on early frames where the signal changes dramatically. Therefore a method needs to be designed that will account for this change in appearance.

While this invention is not necessarily concerned with the gross changes that occur in the early frames of a typical cardiac scan, the changes that occur in the uptake in the myocardium are still significant. Therefore registration using standard intensity based techniques is not optimal.

Furthermore, as PET/SPECT imaging represents functional information, it is expected that the intensity and contrast in the image will vary significantly depending on the disease state of the patient. Moreover, various scanners, reconstruction algorithm and study protocol add more variations to image appearance and quality, and thus difficulties with registration.

These problems have been addressed in a number of ways to date:

No correction. An assumption is made that the left ventricle will not move over the time of the scan. As this assumption is usually not true, errors in the subsequent quantitative analysis will probably occur.

Segmentation-based methods: The requirement of the motion correction is to provide an accurate segmentation of the LV over the course of the scan. Therefore one method to do this is to perform a segmentation for the last frame (or a combination of the last few frames) and then update the segmentation for each new frame. This can lead to errors due to extra cardiac activity which will cause the segmentation of the LV to deform.

Registration methods: A better solution is to use a registration based scheme that estimates the motion of the LV between frames and then updates the segmentation based on that motion. This is usually performed using intensity based methods.

Prior work has investigated phase based registration (Matthew Mellor, Michael Brady, "Phase mutual information as a similarity measure for registration", Medical Image Analysis, Volume 9, Issue 4, August 2005, Pages 330-343) and shown its potential for use in medical imaging. However, using phase directly can be an approach limited in use.

SUMMARY OF THE INVENTION

The present invention aims to address these problems and provide improvements upon the known devices and methods.

In general terms, one embodiment of a method according to the invention for processing medical imaging data of a subject having a physiological or anatomical feature of interest, includes generating from a first set of the imaging data an intensity projection line along a specified axis of an image volume of the data, converting the projection line to a monogenic signal and extracting phase information from the signal, calculating a function of the phase information to produce processed phase information, and using the processed phase information to organize the feature of interest in the first data set.

Because the processed phase information has a good intolerance to changes in image intensity, this method produces images where only the most useful information for location/registration remains, thus allowing for example more accurate motion correction algorithms.

In a further embodiment, the step of organizing includes registering the feature of interest with a second set of imaging data containing the feature of interest.

In another embodiment, the step of organizing includes determining a location of the feature of interest in the image volume.

Suitably, the method further includes identifying at least one landmark in the processed phase information corresponding to an expected landmark for the feature of interest, and using the at least one landmark to delineate an estimated feature region, containing the feature of interest, within the imaging data.

In an embodiment, the step of registering can include using a similarity measure to calculate a transformation for the feature of interest between the first data set and the second data set.

Suitably, the step of registering can further include determining a bounding region of interest in the first data set containing the feature of interest.

Preferably, the method further includes obtaining further sets of imaging data for timepoints along a dynamic scan of the subject; and registering the feature of interest between data sets at the timepoints along the scan.

More preferably, the first data set is obtained from a last timepoint for the dynamic scan. Suitably, the method includes determining an earliest timepoint in the scan for a final data set to be used for registration.

In an embodiment, the step of registering further includes using the similarity measure to determine a motion of the feature of interest during the scan, and to correct at least one of the data sets for the determined motion.

This allows an accurate tracking of the motion of the feature of interest, such as the left ventricle, during the scan period.

Suitably, the method further includes an initial step of smoothing the imaging data. Preferably, the function is a cosine function. Suitably, the step of generating the intensity projection line includes generating a maximum intensity projection line, or a summed intensity projection line, along each of three orthogonal axes of the image volume.

Another embodiment of a method according to the invention for processing medical imaging data of a subject having a physiological or anatomical feature of interest, includes obtaining a series of sets of imaging data for timepoints along a dynamic scan of the subject, using a similarity measure to determine a similarity between consecutive pairs of sets of data, and determining from the similarities measured an earliest timepoint in the scan for an earliest data set to be used for registration of the feature of interest.

Preferably, this last embodiment of the method further includes registering the feature of interest between data sets at the timepoints along the scan, wherein the first data set of the series is from a last timepoint for the dynamic scan.

The invention also encompasses an apparatus for processing medical imaging data, having a computerized processor configured to obtain imaging data of a subject captured by an imaging apparatus, the imaging data having a physiological or anatomical feature of interest; generate from a first set of the imaging data an intensity projection line along a specified axis of an image volume of the data, and to convert the projection line to a monogenic signal and extract phase information from the signal, and to calculate a function of the phase information to produce processed phase information, and to use the processed phase information to organize the feature of interest in the first data set. The apparatus also includes a display device that displays the feature of interest in the first data set.

The present invention also encompasses a non-transitory computer-readable storage medium encoded with programming instructions. When the storage medium is loaded into a computerized image processing system, the programming instructions cause the system to execute the method described above, including all embodiments thereof.

DESCRIPTION OF THE PREFERRED EMBODIMENTS

When the following terms are used herein, the accompanying definitions can be applied:

| | |
|---|---|
| PET | Positron Emission Tomography |
| LV | Left Ventricle |
| CFR | Coronary Flow Reserve |
| BIF | Blood Input Function |
| ROI | Region of Interest |
| SUV | Standardised Uptake Value |

Embodiments of the invention can be used for a phase-based method of motion correction. For example, one such method may essentially be a method of registering a feature in two datasets, which calculates a cosine function of the local phase of each image based on the monogenic signal, resulting in two new images. The two new images can then be registered to calculate a transformation, using a similarity measure and optimiser; and this transformation is then applied to the two original images.

The invention can also be used for segmentation of a feature. For example, a method for segmenting the LV in an image can generate the monogenic signal, extract phase information from it, and identify a landmark in the extracted phase corresponding to an expected landmark (such as the edge of the myocardium) for the feature of interest. This can of course be done for a series of images, for example as a precursor to a registration step as described in other embodiments.

In a particular embodiment, the algorithm assumes a certain amount of pre-processing of the cardiac data, for this particular application, in order to segment the region that requires motion correction. A registration algorithm is then applied to the data, working backwards from the last frame until a cut-off point where data can no longer be successfully registered.

This algorithm uses a phase based method in order to solve the motion correction problem for example for cardiac data. The local phase is derived from the image sequences, and represents the structure of the organ or the region of interests. It therefore has a good tolerance to the changes in image intensity and contrast.

The motion correction is implemented using a registration between the local phase images or enhanced local phase images (e.g. step 4 below, where the myocardium is enhanced).

The following steps are performed. For each consecutive pair of frames to be registered:

1. Smooth the two datasets to be registered using, say, a Gaussian filter. Note that other types of filter could also be used to smooth the data, e.g. a mean filter.

Figure 1:
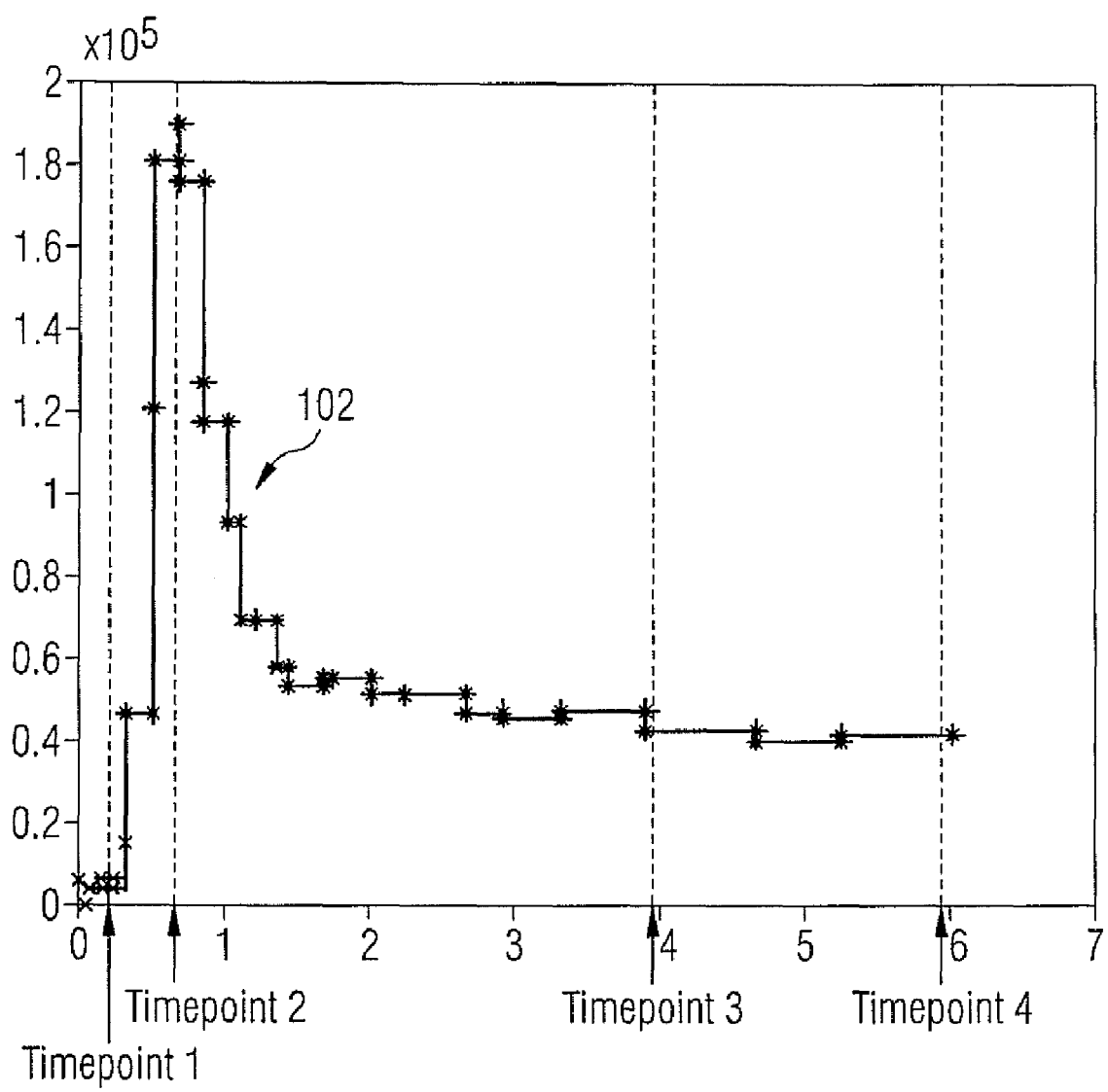
FIG. 1 illustrates the blood input function of a dynamic scan indicating four timepoints.
Figure 2:
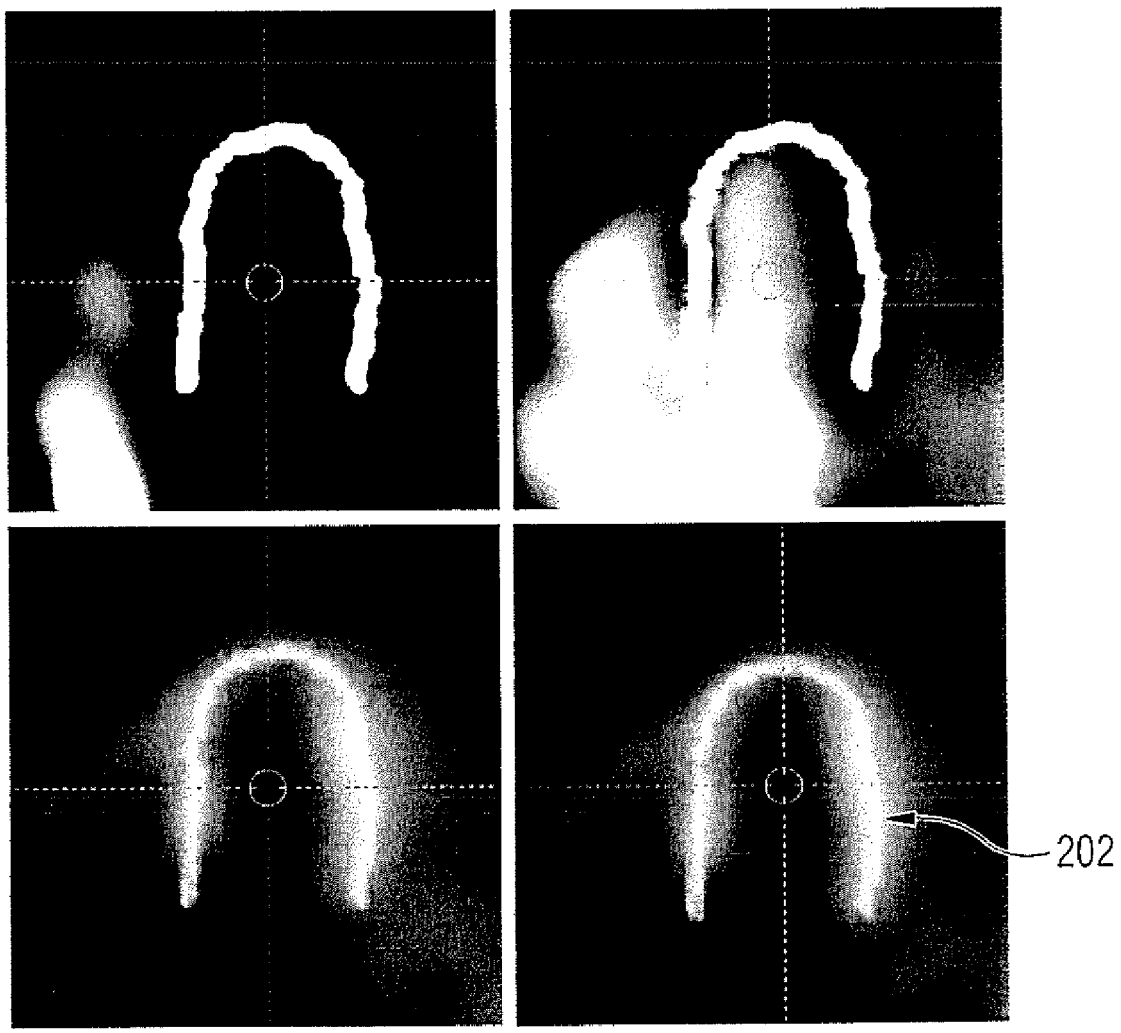
FIG. 2 illustrates the left ventricle (LV) at the same time points as in FIG. 1.
Figure 3:
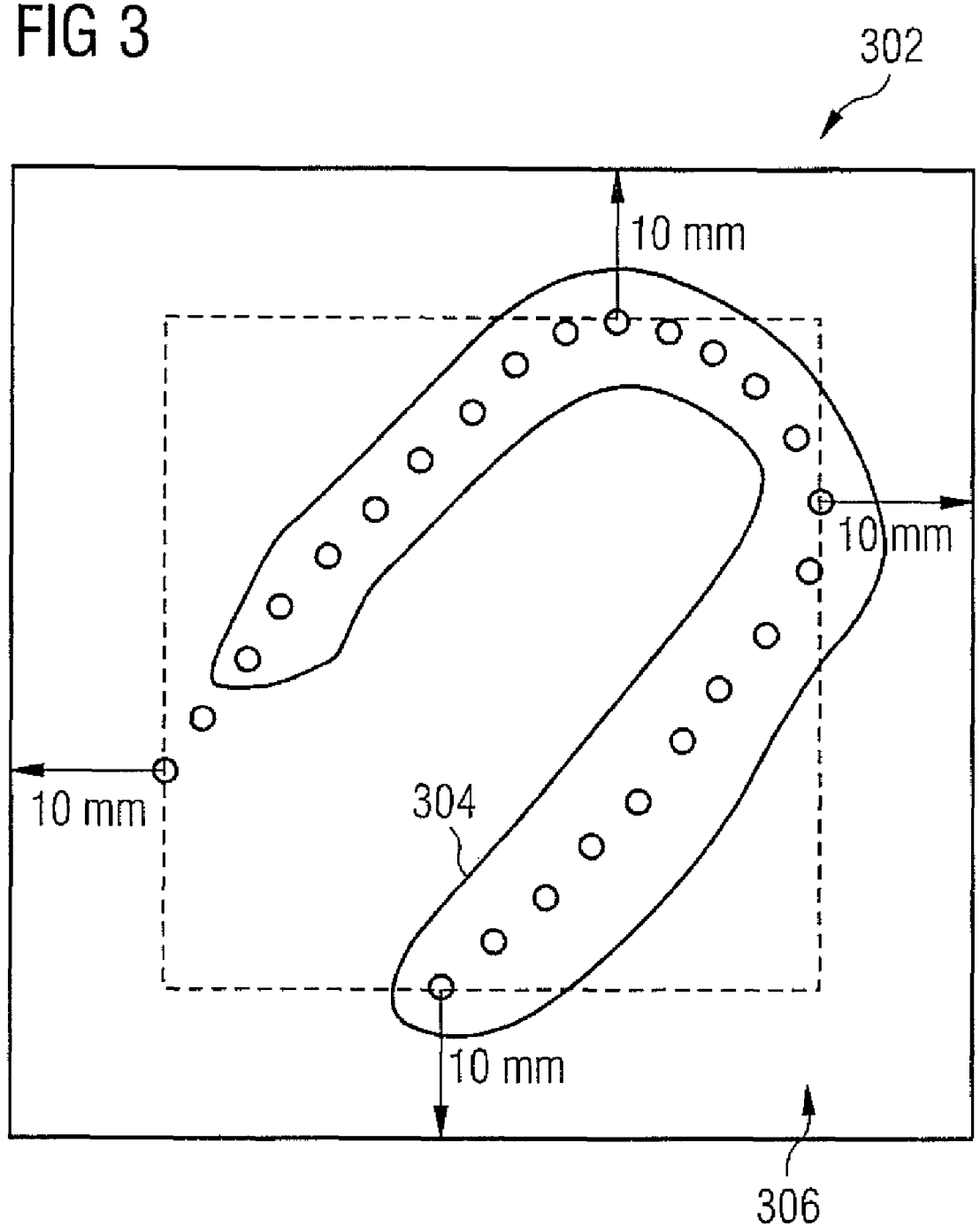
FIG. 3 shows the myocardial region used for the registration, according to an embodiment of the invention.

2. Select a bounding ROI around the LV and myocardium in the data, based on a segmentation previously acquired from the last frame or a combination of the last few frames. This can be done using an automatic heart localisation algorithm, or the results of a Left Ventricle segmentation. This can be done using a variety of algorithms, including searches of the image projections, template-matching, etc. The same ROI, such as that shown in FIG. 3 is used for each frame. FIG. 3 shows the myocardial region (302) used for the registration, defined from the segmentation of the myocardium (304) (plus a 10 mm margin around (306)).

As an example the following steps can be performed to give an ROI:

i) LV localization—use a fast algorithm that uses maximum intensity projections across the entire PET dataset in order to define a bounding box region that contains the Left Ventricle.

ii) LV Reorientation—use an algorithm that calculates the angle of tilt of the LV in the 3D patient space, in order to reorient the LV along the long and short axis views which are used when analyzing the LV.

iii) Myocardial Segmentation—This algorithm takes the results of the LV orientation and performs a segmentation based on a ray tracing technique to find the peak activity along lines that intersect the myocardium. The algorithm also defines apex and base planes as well as a centre of the apical region in order to define the classic mixed cylindrical/spherical geometry of the LV. This segmentation is then smoothed in such a way that outliers from the ray traces are removed and the segmentation is constrained to model an essentially concave shape before applying a median filter to the segmentation to improve smoothness. This segmentation is performed on a weighted sum of the later frames in order to increase Signal to Noise Ratio.

Any of these methods of segmentation may also be based on isolated and processed phase information derived from the original image in the same manner as in steps 3 and 4, thereby giving an initial method of segmentation of the LV. As the processed phase information defines the myocardium much more clearly than the original image, this gives a more accurate segmentation.

3. Calculate the local phase of each volume using the monogenic signal.

Monogenic signal. A 1D signal can be split into local amplitude and local phase using the analytic signal, in which the local phase provides the structural information (such as edge, ridge, valley etc.) and the local amplitude encodes the brightness and contrast information. These two independent and complementary types of information ensure that the local phase is brightness and contrast invariant. The monogenic signal is an extension of the analytic signal to 2D/3D/4D.

More precisely, the signal structures can be detected by the local phase: $\phi=0$ is a ridge, $\phi=\pi/2$ is an up step, $\phi=\pi$ or $-\pi$ is a valley, $\phi=-\pi/2$ is a down step. This phase does not depend on the intensity of the image, which makes the method of detecting features using phase robust to variable contrast in the image.

4. Calculate the new image data as:

$$I(x)=\cos(\phi(x))*(\cos(\phi(x)>0)$$

Figure 6:
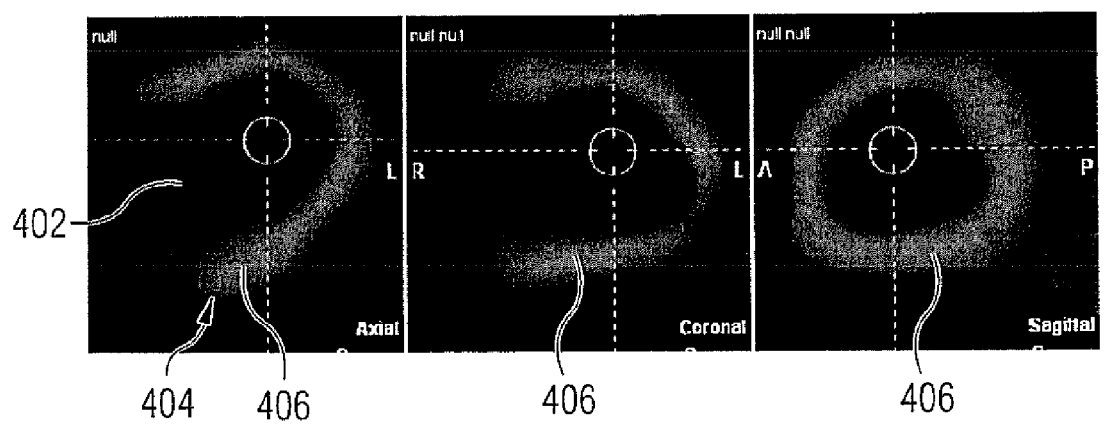
FIG. 6 shows the new image data based on the cosine of the local phase image, according to an embodiment of the invention.

That this results in the image data in FIG. 6.

5. Register the two new datasets using a rigid or translation motion transformation. A correlation based similarity metric can be used as the two images are normalised. This avoids any false minima in the registration optimisation that may arise from using a similarity metric such as Mutual Information. Note however that this could be extended to use different similarity metrics. The similarity measure can be calculated across the whole image, or locally. Since we are aiming to align the LV only, and are not interested in the whole body alignment, it may be preferable to use a local registration over the region of the LV. This will also be faster than calculating the similarity across the whole image.

Note that these transformations do not allow for deformations, which is a fair assumption as the LV does not typically change shape over the course of a five minute scan. This means that the shape of the LV should remain constant. A concern with rigid registration may be that large rotations about the LV long axis may be computed, due to the symmetry of the LV shape around the long axis. However, such rotations are not expected to occur in reality, due to the fact that the heart is only expected to move around in a restricted area within the thoracic cage. If such large erroneous rotations are found to be a problem in this algorithm, then a 'translation only' algorithm is implemented in preference.

Figure 4:
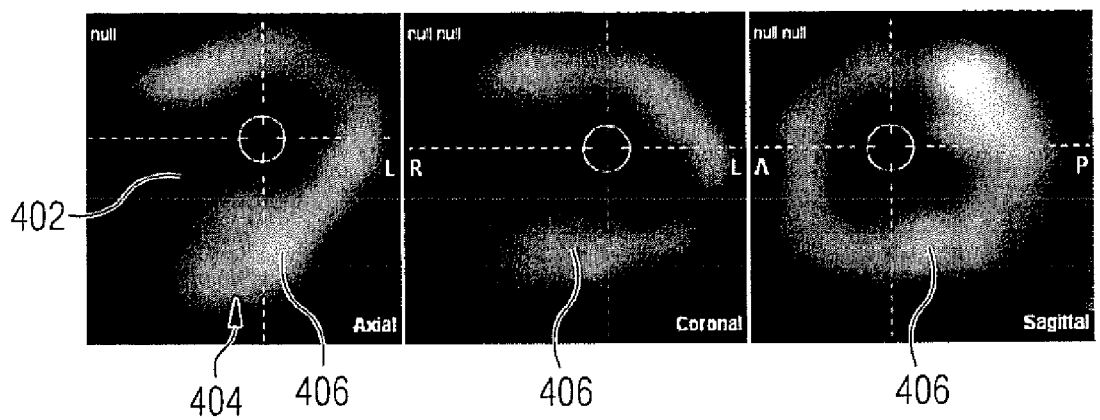
FIG. 4 shows the initial volume data set according to an embodiment of the invention.
Figure 5:
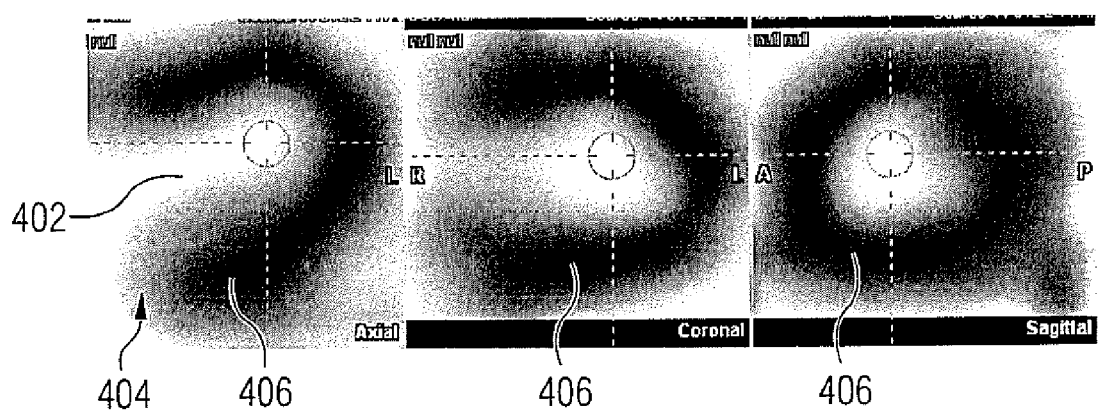
FIG. 5 shows the local phase of the data set of FIG. 4, according to an embodiment of the invention.

The creation of the processed image, a function of the phase image, at step 4 has many advantages:

i. it can be seen in FIGS. 4 to 6 that the level of intensities has been normalised through the volume, bright areas and darker areas of LV in the original volume in FIG. 4 are now of the same intensity;

ii. the LV cavity and the outside of the heart have been zero-ed, which leaves an image with solely the information of where the myocardium is, with much less spurious information than the original image;

iii. two images generated at two different frames will now have very similar intensity distributions, without the need for additional normalisation.

The differences in the image data produced are illustrated in FIGS. 4 to 6. FIG. 4 shows the initial volume data set, with the background (402), the left ventricle area (404) and the myocardium (406). FIG. 5 shows the local phase of the data set of FIG. 4. FIG. 6 shows the new image data based on the cosine of the local phase image. The images in FIG. 6 clearly delineate the myocardium. The loss of apical uptake is also no longer visible in the cosine image.

The function (in this case cosine) of step 4 converts a phase image into a more realistic image which is more suited to registration.

In addition to the segmentation and registration steps, the point at which the registration should stop can be calculated. Such cut-off would not need to be calculated in theory if all frames were motion-corrected, but in reality, the limited amount of information in the early frames will make it difficult for correct motion to be detected, with the appearance changing so much and the noise being so high (due to the short length of the frames). Therefore, an object is to correct as early as possible without creating erroneous results. Stopping toward the early frames is not too problematic as the early frames are short (5-10 s each), and therefore, it is not expected that much motion would have occurred anyway.

This cut-off point can be estimated at any point in the motion correction algorithm. It could be estimated from the data before any motion correction is started. Alternatively it could be estimated after each frame has been corrected and then discarding those frames where the motion correction is not used. Finally it could be calculated in parallel to the motion correction using the results of each stage to determine whether motion correction should be stopped.

The following secondary embodiment is a fast, automatic method for providing the best cut-off point for motion correction. It does this by quantitatively analysing at the level of appearance change over the course of the scan. The following steps are performed:

1. An 'average' image of the final frames is calculated, providing a typical 'late frame' dataset, where the tracer distribution is sufficiently stable and the noise acceptably low (averaging increases signal to noise ratio (SNR)).

2. The bounding box computed from the myocardial segmentation is used to trim each frame of the sequence (FIG. 3)—the bounding box is not displaced throughout the sequence, hence the 10 mm margin.

3. For each trimmed frame, the Correlation Coefficient (R) is calculated from the current frame and the averaged 'late frame'. R is based on the covariance (C) between the two sets of intensity values, x and y, defined as: where $$R(x, y) = \frac{C(x, y)}{\sqrt{C(x, x)C(y, y)}}$$

$$C(x, x) = \sum_{i=1}^{N} (x_i - \bar{x})^2, \ C(y, y) = \sum_{i=1}^{N} (y_i - \bar{y})^2,$$

$$C(x, y) = \sum_{i=1}^{N} (x_i - \bar{x})(y_i - \bar{y}),$$

N is the number of voxels in the trimmed frame, and $\bar{x}$ and $\bar{y}$ are the mean values. This metric measures the similarity of intensities in both datasets. Note that for different embodiments, different similarity metrics could be used.

Figure 7:
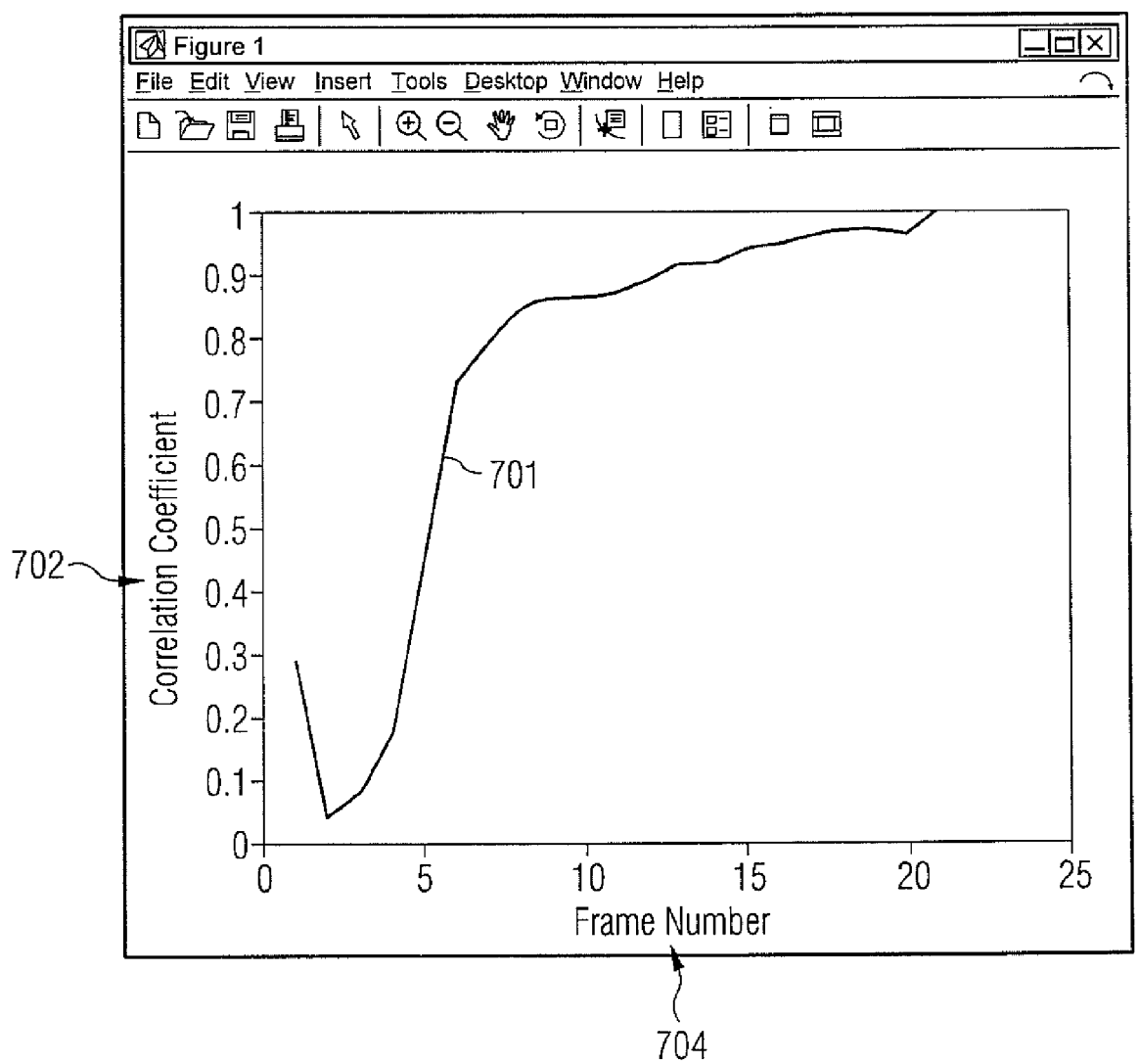
FIG. 7 shows a plot of Correlation Coefficient across the dynamic cardiac frames, according to an embodiment of the invention.

4. The metric (R) is measured over the course of the dynamic frames, as the example in FIG. 7 shows, and the cut-off can be defined from a feature of the curve. In the case of Correlation Coefficient for the LV motion correction in this embodiment a cut-off is defined at the point where the Correlation Coefficient drops to the specific threshold of 0.65. Note this threshold can be changed depending on the desired outcome and application.

FIG. 7 shows a plot (701) of Correlation Coefficient (702) across the dynamic cardiac frames (704).

5. Having defined the cut-off point, the motion correction can be performed from the last frame of the sequence back to the calculated cut-off time. We note that metrics other than the Correlation Coefficient (e.g. Sum Squared Differences or Mutual Information) and different cut-off criteria could be used to extend this method for different applications.

A different embodiment may use different registration approaches before and after the cut-off points, perhaps using different similarity measures.

The segmentation, registration and cut-off method described in the sections above has been tested on 82 datasets, NH3 and Rb, and assessed visually. Good tracking was achieved for both drift and twitch-type motions.

In cases where there is no or little motion, only a small registration is computed. In cases of larger motion the translations were found correctly. Small rotations were also found in some cases, but the algorithm did not produce a rotation of more than 7 degrees about the long axis between consecutive frames. Average rotation about the long axis is typically less than 1 degree.

Since the method performs registration and therefore does not change the shape of the LV segmentation, there were no failures resulting from extra cardiac activity changing the segmentation. This was a problem in previous motion correction algorithms. There were no examples in the tested datasets of the registrations falling into incorrect local minima.

Figure 8:
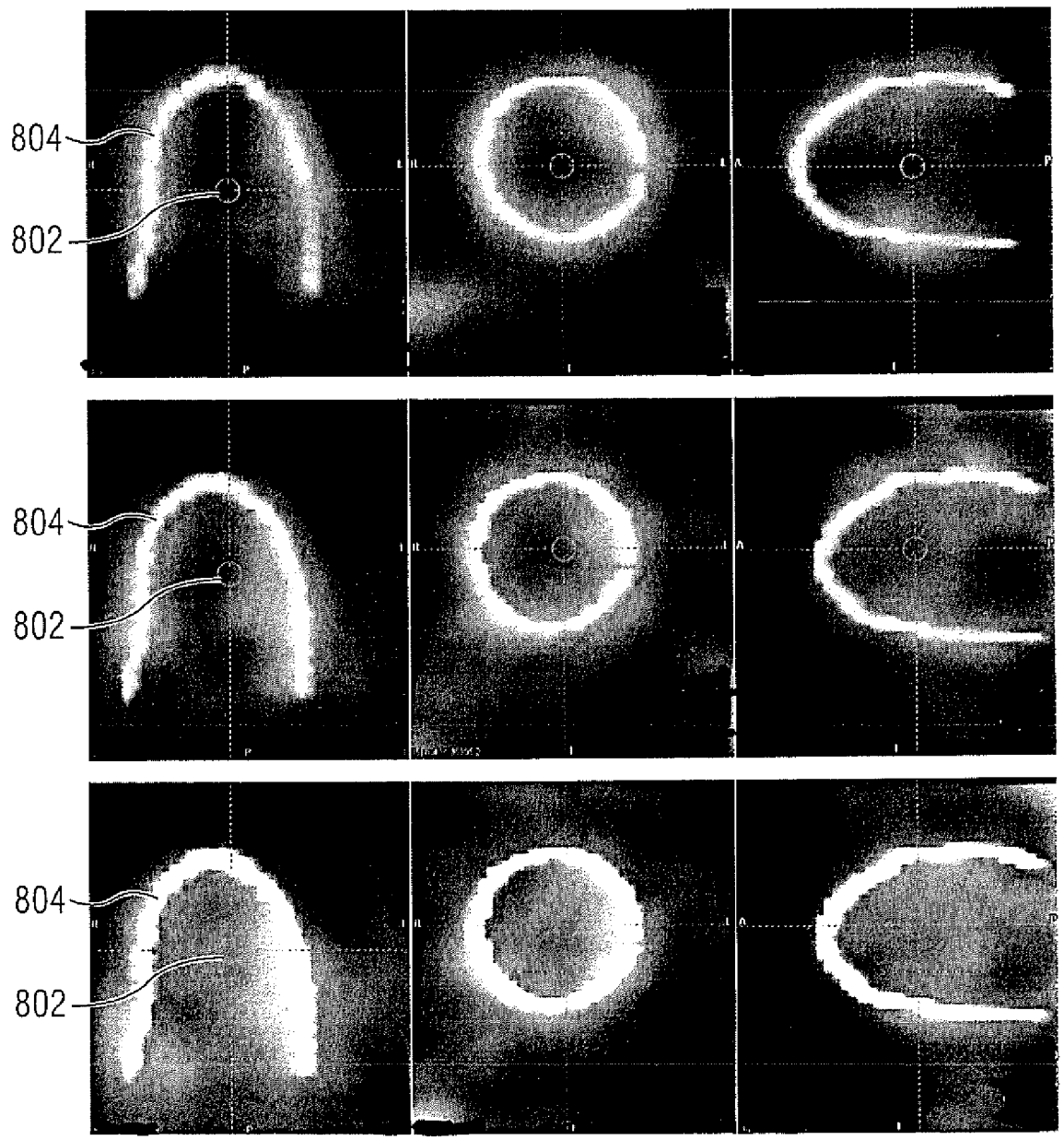
FIG. 8 shows a segmentation with motion correction of three consecutive frames of an NH3 dataset, according to an embodiment of the invention.
Figure 9:
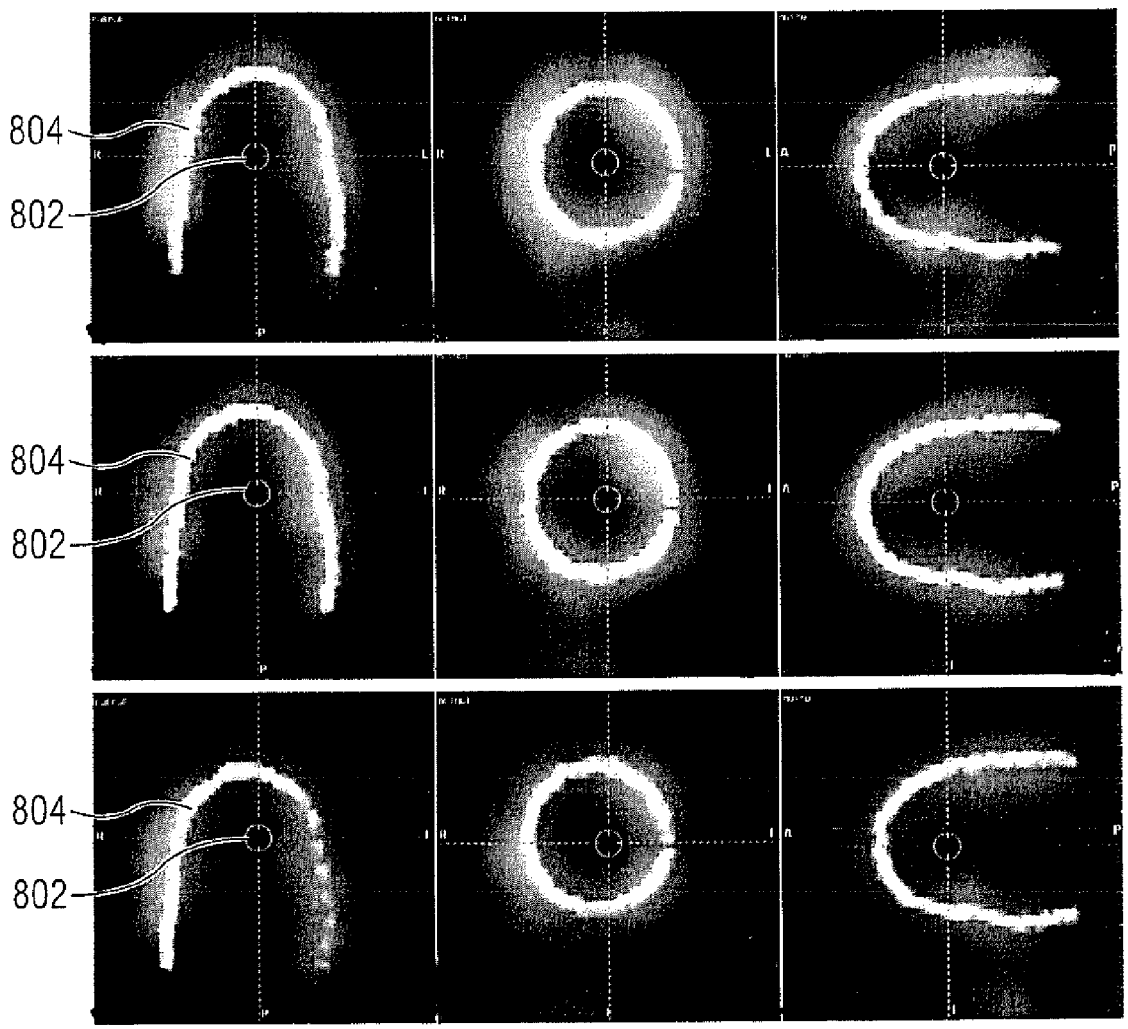
FIG. 9 shows a segmentation with motion correction of three consecutive frames of a Rb dataset.

Two examples are given in FIG. 8 and FIG. 9 for NH3 and Rb data for consecutive frames. FIG. 8 is a segmentation with motion correction of three consecutive frames of an NH3 dataset. Note that the cross-hair (802) remains stationary and the LV (804) moves. FIG. 9 shows a segmentation with motion correction of three consecutive frames of a Rb dataset. Note again that the cross-hair (902) remains stationary and the LV (904) moves.

In an alternative embodiment of the algorithm, the optimisation of the algorithm in terms of speed can be achieved using a Lucas-Kanade approach.

The method can be extended to provide a segmentation and/or registration of any structure with a clear edge (depending on the modality, skull, cortex, etc.)

Different registration schemes can be used for different frames of the data. For example, early and late frames look quite different and therefore different registration methods, i.e. different similarity measures may be used accordingly.

Figure 10:
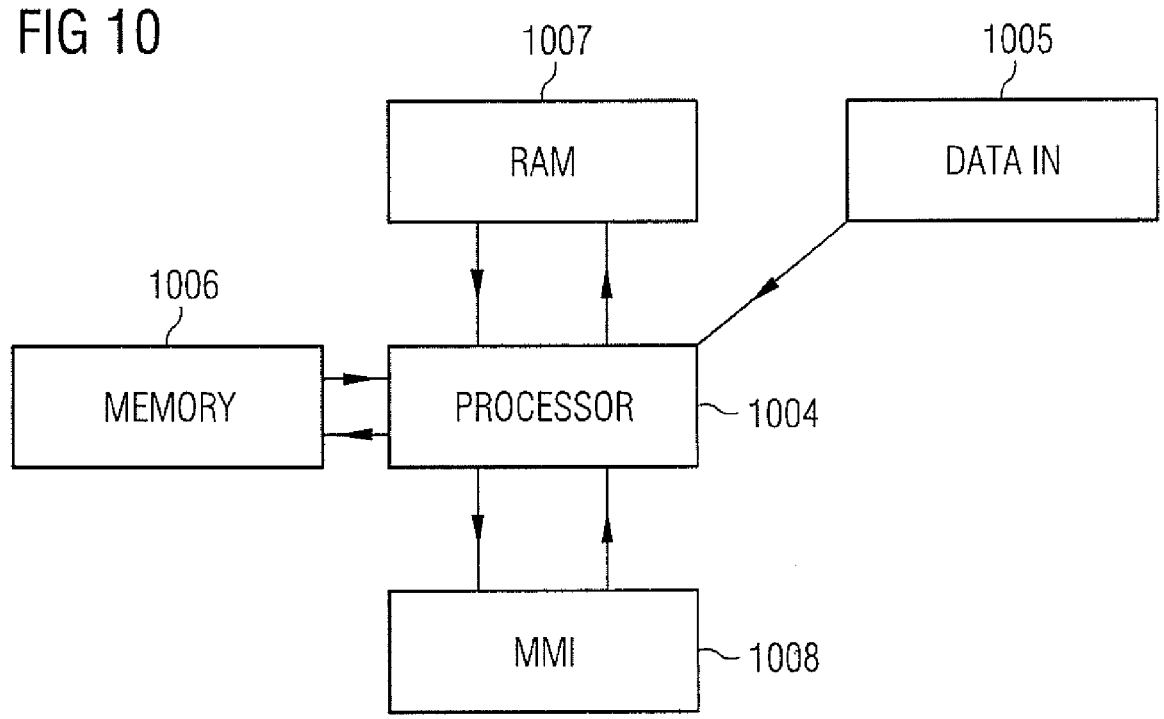
FIG. 10 is a diagram illustrating an apparatus according to an embodiment of the invention.

Referring to FIG. 10, the above embodiments of the invention may be conveniently realized as a computer system suitably programmed with instructions for carrying out the steps of the methods according to the invention.

For example, a central processing unit 1004 is able to receive data representative of medical scans via a port 1005 which could be a reader for portable data storage media (e.g. CD-ROM); a direct link with apparatus such as a medical scanner (not shown) or a connection to a network. For example, in an embodiment, the processor performs such steps as generating from a first set of the imaging data an intensity projection line along a specified axis of an image volume of the data, converting the projection line to a monogenic signal and extracting phase information from the signal, calculating a function of the phase information to produce processed phase information, and using the processed phase information to organize the feature of interest in the first data set.

Software applications loaded on memory 1006 are executed to process the image data in random access memory 1007.

A Man-Machine interface 1008 typically includes a keyboard/mouse/screen combination (which allows user input such as initiation of applications) and a screen on which the results of executing the applications are displayed.

It will be appreciated by those skilled in the art that the invention has been described by way of example only, and that a variety of alternative approaches may be adopted without departing from the scope of the invention, as defined by the appended claims.

We claim as our invention:

1. A method of processing medical imaging data of a subject having a physiological or anatomical feature of interest, comprising:
   in a computerized processing system, generating from a first set of imaging data, an intensity projection line along a specified axis of an image volume of the data;

in said computerized processing system, converting the projection line to a monogenic signal and extracting phase information from the signal;

in said computerized processing system, calculating a function of the phase information to produce processed phase information; and in said computerized processing system, using the processed phase information to organize the feature of interest in the first data set and making the first data set with the feature of interest organized therein available at an output of the computerized processing system.

2. A method according to claim 1, wherein the step of organizing comprises registering the feature of interest with a second set of imaging data containing the feature of interest.

3. A method according to claim 2, wherein the step of registering comprises using a similarity measure to calculate a transformation for the feature of interest between the first data set and the second data set.

4. A method according to claim 3, further comprising:

in said computerized processing system, identifying at least one landmark in the processed phase information corresponding to an expected landmark for the feature of interest; and in said computerized processing system, using the at least one landmark to delineate an estimated feature region, containing the feature of interest, within the imaging data.

5. A method according to claim 2, wherein the step of registering further comprises determining a bounding region of interest in the first data set containing the feature of interest.

6. A method according to claim 2, further comprising:

in said computerized processing system, obtaining further sets of imaging data for timepoints along a dynamic scan of the subject; and in said computerized processing system, registering the feature of interest between data sets at the timepoints along the scan.

7. A method according to claim 6, wherein the first data set is obtained from a last timepoint for the dynamic scan.

8. A method according to claim 6, comprising determining an earliest timepoint in the scan for a final data set to be used for registration.

9. A method according to claim 6, wherein the step of registering further comprises using the similarity measure to determine a motion of the feature of interest during the scan, and to correct at least one of the data sets for the determined motion.

10. A method according to claim 1, wherein the step of organizing comprises determining a location of the feature of interest in the image volume.

11. A method according to claim 1, the method further comprising an initial step of smoothing the imaging data in said computerized processing system before generating said intensity projection line.

12. A method according to claim 1, comprising calculating a cosine function as said function of the phase information.

13. A method according to claim 1, wherein the step of generating the intensity projection line comprises generating a maximum intensity projection line, or a summed intensity projection line, along each of three orthogonal axes of the image volume.

14. A method of processing medical imaging data of a subject having a physiological or anatomical feature of interest, comprising:

providing a computerized processing system with a series of sets of imaging data obtained for timepoints along a dynamic scan of the subject;

in said computerized processing system, using a similarity measure to determine a similarity between consecutive pairs of sets of data; and in said computerized processing system, determining from the similarities measured an earliest timepoint in the scan for an earliest data set to be used for registration of the feature of interest and making the first data set with the feature of interest organized therein available at an output of the computerized processing system.

15. A method according to claim 14, further comprising in said computerized processing system, registering the feature of interest between data sets at the timepoints along the scan, wherein the first data set of the series is from a last timepoint for the dynamic scan.

16. An apparatus for processing medical imaging data, comprising:

a computerized processor configured to receive imaging data of a subject captured by an imaging apparatus, the imaging data having a physiological or anatomical feature of interest; generate from a first set of the imaging data an intensity projection line along a specified axis of an image volume of the data; convert the projection line to a monogenic signal and extracting phase information from the signal; calculate a function of the phase information to produce processed phase information; and use the processed phase information to organize the feature of interest in the first data set; and a display device in communication with said computerized processor and operated by said computerized processor to display the feature of interest in the first data set.

17. A non-transitory computer-readable storage medium encoded with programming instructions, said storage medium being loadable into a computerized processing system, and said programming instructions causing said computerized processing system to:

generate from a first set of imaging data, an intensity projection line along a specified axis of an image volume of the data;

convert the projection line to a monogenic signal and extracting phase information from the signal;

calculate a function of the phase information to produce processed phase information; and use the processed phase information to organize the feature of interest in the first data set, and make the first data set with the feature of interest organized therein available at an output of the computerized processing system.

18. A non-transitory computer-readable storage medium encoded with programming instructions, said storage medium being loadable into a computerized processing system, and said programming instructions causing said computerized processing system to:

receive a series of sets of imaging data obtained for timepoints along a dynamic scan of the subject;

use a similarity measure to determine a similarity between consecutive pairs of sets of data; and determine from the similarities measured an earliest timepoint in the scan for an earliest data set to be used for registration of the feature of interest, and make the first data set with the feature of interest organized therein available at an output of the computerized processing system.

* * * * *